United States Patent [19]

Calabro

[11] 4,452,555

[45] Jun. 5, 1984

[54] ATTACHMENT APPARATUS

[75] Inventor: Francis C. Calabro, Pittston, Pa.

[73] Assignee: The Union Corporation, Verona, Pa.

[21] Appl. No.: 303,549

[22] Filed: Sep. 18, 1981

[51] Int. Cl.³ .............................................. B60P 3/40
[52] U.S. Cl. .................................. 410/53; 280/43.23;
410/81; 414/459
[58] Field of Search ................ 280/DIG. 8, 63, 43.11,
280/145, 43.23, 47.13 R; 410/44, 45, 53, 54, 66,
80, 81, 82; 296/35.1, 35.3; 105/381; 24/221 RC,
287; 220/1.5, 23.4; 411/422, 402, 397

[56] References Cited

U.S. PATENT DOCUMENTS

| 2,968,490 | 1/1961 | Baus ...................................... 280/35 |
| 3,378,276 | 4/1968 | Fulmer ............................ 280/43.23 |
| 3,438,671 | 4/1969 | Seng ............................. 280/DIG. 8 |
| 3,456,967 | 7/1969 | Tantlinge ............................... 24/287 |
| 3,521,898 | 7/1970 | Fulmer et al. .................... 280/43.23 |
| 4,196,673 | 4/1981 | Looks ........................... 280/DIG. 8 |
| 4,209,887 | 7/1980 | Saunder ............................... 220/1.5 |
| 4,231,709 | 11/1980 | Corsetti ........................... 280/43.23 |
| 4,352,613 | 10/1982 | Bertolini ............................... 410/82 |

FOREIGN PATENT DOCUMENTS

| 1231743 | 1/1967 | Fed. Rep. of Germany ...... 105/381 |
| 2408643 | 9/1974 | Fed. Rep. of Germany ....... 220/1.5 |
| 1016737 | 4/1952 | France ............................... 411/422 |

OTHER PUBLICATIONS

International Standardization Organization (ISO) Standards Booklet, ISO 668-1979 (E).
Line Fast Corporation of Holbrook, New York, "Swing Loc Bridge", Data Sheet DD717, sheets 1-4.
Machinery's Handbook, 19th Edition, p. 1337.

Primary Examiner—David M. Mitchell
Attorney, Agent, or Firm—Fleit, Jacobson, Cohn & Price

[57] ABSTRACT

An attachment apparatus for releasably attaching a structure, such as a wheel assembly, to a standardized ISO container is disclosed. The ISO container includes standardized holes or openings situated in each corner of the container. The structure to be attached includes holes or openings that are substantially alignable with the ISO openings along the bottom edge of the container well. A locking lug is provided which is carried in the structure openings and releasably engageable with the ISO container openings. The locking lug comprises a shaft having an enlarged end portion which fits through the container openings. When inserted, the shaft is rotatable to a locking position. The locking lug is then tensioned to provide a secure and tight coupling between the structure and the container. The structure to be attached to the container is a wheel assembly having an interface assembly for interfacing with the container wall. The interface assembly includes foldable arms pivotable between an upright position, wherein the ends of the arms are coupled with the container, to a folded position, for transport.

18 Claims, 11 Drawing Figures

ATTACHMENT APPARATUS

BACKGROUND OF THE INVENTION

1. Field of the Invention

The invention relates to an apparatus for attaching a structure to a body unit, such as a container, having standardized ISO corner openings in each corner of the body unit. The structure to be attached to the body unit is typically a wheel assembly, such as a demountable running gear, which connects with the body unit and elevates the body unit to form a wheeled land-transportable unit. The wheel assembly is releasably secured to the body unit.

2. Background Art

Over the years, a number of wheel assemblies, called demountable running gears, have been devised which provide for quick and easy attachment to a container whereby the container is elevated into a position for ground mobility. Typical wheel assemblies are described in U.S. Pat. Nos. 2,968,490, 3,378,276, and 3,521,898, incorporated herein by reference. Such wheel assemblies are typified by a pair of wheels, rotatably mounted upon an axle, having a pair of support arms extending from the axle, in substantially parallel relationship, to pivotally engage upstanding frame members which, in turn, are secured to the container to be transported. Hydraulic piston and cylinder arrangements are connected between the support arms and the upper portion of the upstanding frame members, which cause a pivotable rotation between the upstanding members and the support arms. Such rotation elevates the container, thus providing a simple and convenient mechanism for making the container land transportable.

Various apparatus for attaching the demountable running gear to the container, or shelter, have been devised, as are shown in the above-mentioned prior art patents. Generally, the shelter had to be specifically adapted with mounting apparatus for attachment to the demountable running gear. For example, as shown in U.S. Pat. No. 3,521,898 (FIGS. 14-16), a particular adapter frame is provided for coupling with the demountable running gear, and mating with the shelter. In that particular embodiment, the shelter includes downwardly opening sockets, or recesses, which mate with a bracket attached to the adaptor frame structure. The frame structure includes apertures for bolting with tapped holes in the container.

In recent years, container designs have been standardized for transport by ships and flat bed truck trailers. Such containers include standardized corner fittings as shown and described in the International Standardization Organization (ISO) Standards Booklet, ISO 668-1979(E). These corner fittings typically include three perpendicular face plates which comprise the corners of the container. Each face of the corner fittings define substantially oblong openings, of standardized dimension.

The standardized containers with corner fittings (hereinafter sometimes called "ISO containers"), are adapted to be stacked on top of each other, or mated end-to-end, or in side-to-side relationship. Typically, an attachment apparatus is provided to join the corner fittings of one container to the corner fitting of an adjacent container. A typical attachment apparatus is manufactured by Line Fast Corporation of Holbrook, N.Y., and called a "Swing Loc Bridge", as depicted in Line Fast's data sheet DD717, sheets 1-4.

With the advent of the standardized ISO container, a need has arisen to make such ISO container land transportable in a manner similar to that shown in the above-mentioned prior art patents. It is thus desirable to provide an apparatus for attaching a demountable running gear to the present ISO containers.

SUMMARY OF THE INVENTION

The present invention relates to a novel attachment apparatus for releasably attaching a structure, such as a wheel assembly, to a container having standardized ISO holes, or openings, situated in each corner of the container. The structure to be attached to the container includes holes, or openings, that are substantially alignable with one or more openings of the container. The structure to be attached includes a locking lug which is inserted in the structure openings for locking the structure with the container.

The novel locking lug of the present invention comprises a shaft having an enlarged end portion which is insertable through the openings of the container, whereby rotation of the shaft, after insertion, results in movement of the enlarged end portion into a blocking position to prevent removal of the enlarged end portion from the container. When the shaft is rotated to its blocking position, the opposite end portion of the locking lug which extends from the attached structure, is tensioned, such as by a threaded nut, to provide a secure and tight connection between the structure to be attached and the container. The nut threadingly engages with self-locking threads on the lug shaft so that the shaft is locked in its blocking position and cannot become unlocked in the course of normal usage.

The locking lug of the present invention is capable of attaching various types of structure to the ISO container. One particular type of structure to which the present invention relates is a wheel assembly to make the container land transportable. A particular type of wheel assembly is a demountable running gear, as described in the above-cited prior art, but having a novel interface assembly for interfacing with a container wall. The novel interface assembly comprises a transverse beam, positionable across the bottom edge of the container, and a pair of vertical beam assemblies extending upwardly and perpendicularly from the transverse beam, from opposite ends of the transverse beam. In the corners defined by the transverse beam and vertical beam assemblies are openings for substantial alignment with the openings of the ISO container. The upper portions of the vertical beam assemblies are swingable from a vertical position, where they can be interconnected with the ISO corner openings on the top wall of the ISO container, to a horizontal position, for stowage during transportation. A second pair of intermediate vertical beams extends from the transverse beam and includes supporting and locking mechanisms for receiving the swingable beams, when the latter are swung to a position substantially parallel to the transverse beam.

The novel interface assembly not only provides for safe and easy installation of a wheel assembly to an ISO container, but provides for coupling, or marrying, a pair of wheel assemblies to each other for transport of the wheel assemblies independent of the container. In such arrangement, the swingable beams are folded substantially parallel to the transverse beam, and locked to the intermediate beams. The interface assemblies are then securely locked to each other through the use of specially designed ISO blocks which include ISO openings to receive the locking lugs.

Thus, it is an object of the present invention to provide a novel attaching apparatus for releasably attaching a structure to a container having standardized ISO corner openings. The attaching apparatus is simple in design, easy to install, and secure in operation.

It is a further object of the present invention to provide a novel interface assembly for interfacing a wheel assembly, in particular a demountable running gear, with a standard ISO container having ISO corner openings. The novel interface assembly includes swingable vertical members that interlock with the ISO container, at the top wall of the container, when the wheel assembly is attached to the container.

Still further, it is an object of the present invention to provide a novel interface assembly for interfacing a pair of wheel assemblies to each other, thus providing a compact, maneuverable, and secure structure for transporting the wheel assemblies independent of the container.

These and other objects of the invention will become more apparent when reference is made to the accompanying drawings and detailed description thereof.

DETAILED DESCRIPTION OF THE DRAWINGS

Figure 1:
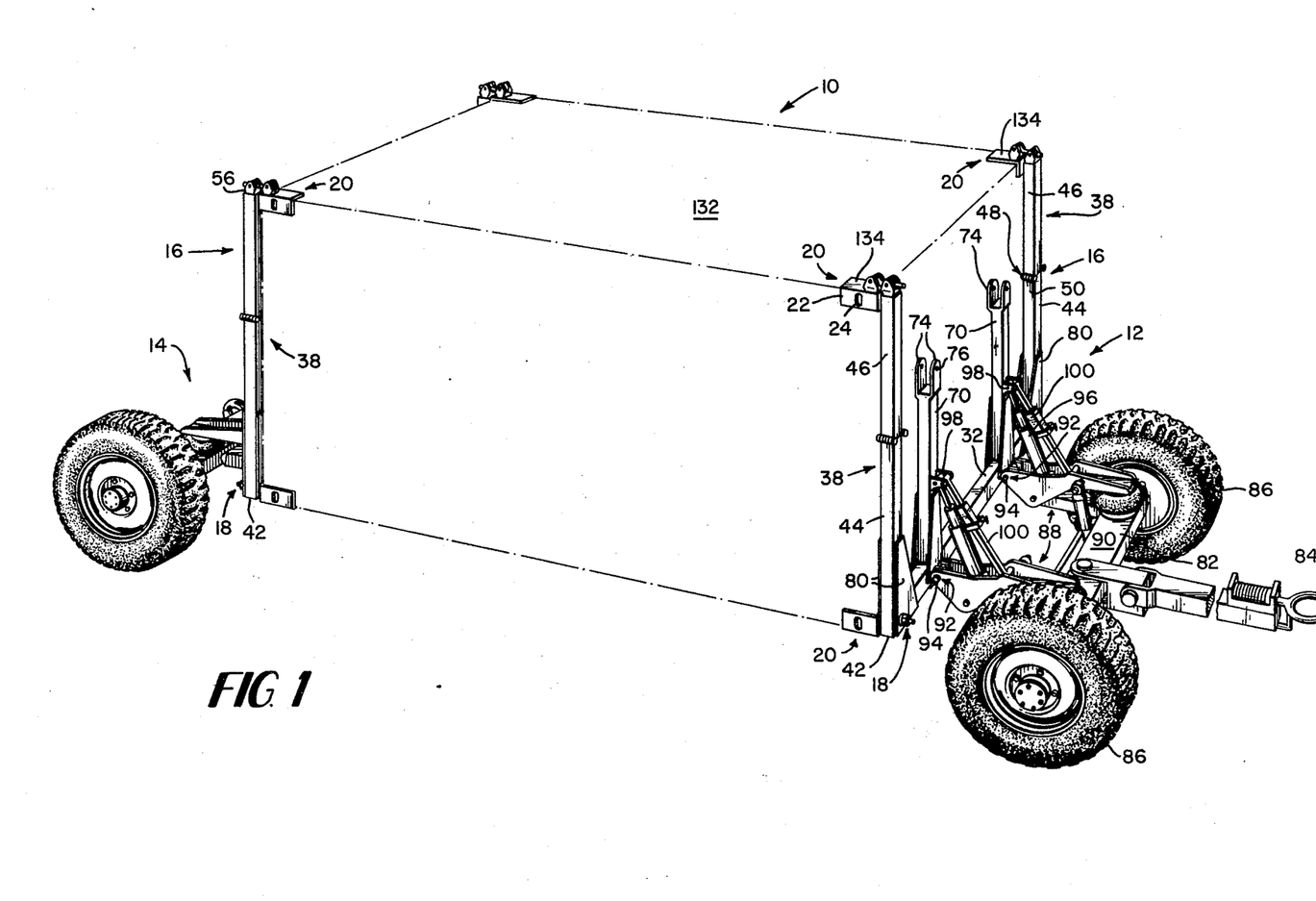
FIG. 1 is a perspective view of a front and rear wheel assembly releasably secured to a container having standardized ISO corner opening.

Referring now to the drawings, the numeral 10 generally designates a body unit, or container, to which is coupled a front and rear demountable running gear, designated generally by the numerals 12 and 14, respectively. The demountable running gear are connected with an interface assembly, generally designated by the numeral 16. The interface assembly is coupled with the container, at the bottom of the container, through means of the novel locking lug, generally designated by the numeral 18.

The container 10 is generally shaped in the form of a rectangular, or square prism, having various widths, lengths and heights. The container may be a completely enclosed box, with suitable access arrangements, such as a door, for permitting entry therein, or, may conceivably be a substantially open shelter, such as formed by interconnecting beams.

Figure 4:
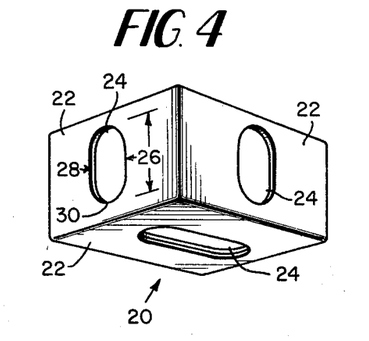
FIGS. 4 and 5 are perspective views of ISO corner fittings, as are known in the art.
Figure 5:
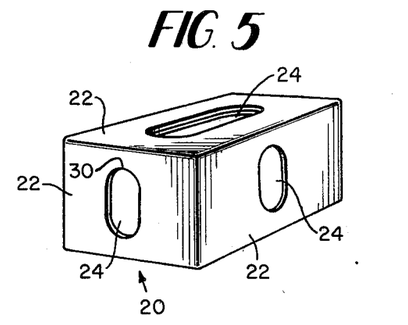

An ISO container 10, sometimes referred to as an ISO freight container, is typified by standardized ISO corner fittings 20 mounted at each corner of the container 10. The ISO corner fittings 20 are castings that may typically comprise three substantially perpendicular plates 22, forming corner faces, that define each projecting corner of the container 10. FIG. 4 depicts a corner fitting 20 that may comprise the bottom, right side corner (when looking at the container end wall); FIG. 5 depicts a corner fitting 20 that may comprise the top, right side corner. The corner fittings 20 are an integral part of the container and may be attached to the container such that they are flush with each wall of the container, as shown in the drawings. Alternatively the corner fittings may be mounted slightly spaced from the container walls to overhang the container walls.

The corner fittings 20 include, at each face 22 thereof, substantially oblong openings 24 which are of standardized dimension. The standardized opening dimensions are described in the ISO Standards Booklet, ISO 668-1979(E). Generally, each oblong opening has a major axis 26 and a minor axis 28 with the ends of the opening along the major axis being substantial arcs 30 of a circle.

Figure 2:
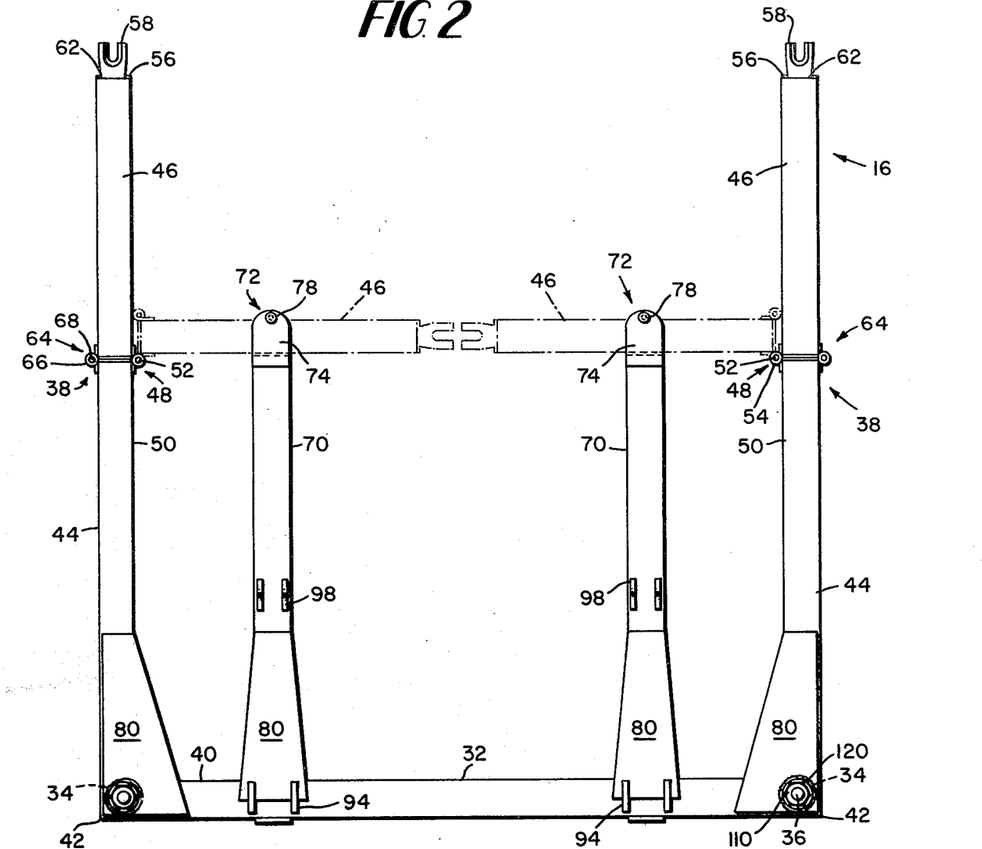
FIG. 2 is an end view of an interface assembly.

The wheel assembly 12 or 14 is coupled with an interface assembly 16, the latter of which is coupled to the container 10. The interface assembly 16 comprises a transverse beam 32 having a length substantially equal to the width of the container end walls. Openings 34 are provided adjacent opposite ends of the transverse beam 32 and spaced apart substantially the same distance as are the oblong openings 24 on the bottom end wall of the container 10. The openings 34 are adapted to receive the cylindrical shaft portion 36 of the locking lug 18, described below. The openings 34 are preferably circular having a diameter greater than the diameter of the locking lug shaft 36 so that the locking lug 18 is loosely confined in the openings 34.

Extending upwardly from each transverse beam 32, substantially directly above the openings 34, are a pair of vertical beam assemblies 38. The vertical beam assemblies 38 may be fixedly mounted at the top 40 of the transverse beam 32. Alternatively, the transverse beam 32 may be slightly less than the width of the container end wall and the vertical beam assemblies may be end mounted at opposite ends of the shortened transverse beam. In such configuration, the openings 34 in the interface assembly 16 will be in the vertical beam assemblies. Preferably, the transverse beam and the upstanding vertical beam assemblies are mitred at 45° and connected together, by welding, along the 45° angle. In any arrangement, the openings 34 in the interface assembly 16 are in the corners 42 defined by the vertical beam assemblies and the transverse beam.

The vertical beam assemblies 38, positioned at opposite ends of the transverse beam 32, include a pair of vertical end beams 44, each having a length substantially half the height of the container, to which is attached a swingable beam 46. Each swingable beam 46 corresponds in cross-sectional shape to the vertical end beam 44 and is hingedly connected, at 48, to the vertical end beam 44 at the opposed faces 50 of the vertical beam, as shown. The swingable beams 46 pivot about a hinge pin 52 which is insertable in hinge portions 54 affixed to the vertical end beam 44 and the swingable beam 46.

Figure 8:
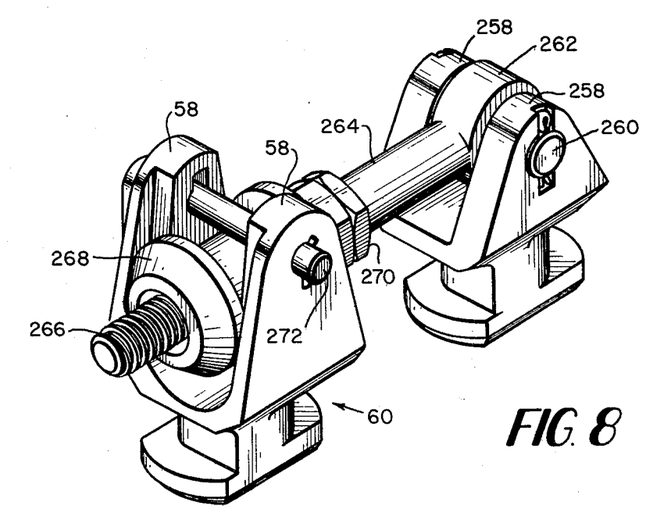
FIG. 8 is a perspective view of the prior art swinglock bridge.

The swingable beam 46, at its free end 56, includes a substantially U-shaped yoke 58, which is adapted to mate with ISO corner castings 20 at the top of the container, in a manner to be described. The U-shaped yoke 58 may be integral with the swingable beam, or, as shown in FIG. 8, may comprise an insert 60 which is fitted into an opening 62 in the top face of the U-shaped beam. In particular, the U-shaped yoke may be a "swing loc" bridge portion manufactured by Line Fast Corp., as described above, and as shown in Data Sheet DD717, sheets 1-4, dated Oct. 14, 1976, incorporated herein by reference. Such "swing loc" bridge is shown in FIG. 8. The length of the swingable beam 46 is such that, when the vertical end beam 44 and the swingable beam 46 are in alignment, i.e., both substantially vertical, the top face 56 of the swingable beam 46 is substantially on the same plane with the top face of the ISO corner casting on the top wall 132 of the container 10.

It should also be noted that the swingable and vertical end beams 44, 46 include a locking pin arrangement 64, comprised of interlocking lugs 66 having a cylindrical opening extending therethrough, which cylindrical opening may receive a locking pin 68 to retain the vertical end beams 44 and swingable beams 46 in their upright position.

Between the two vertical end beams are a pair of vertical intermediate beams 70 which are fixedly connected with, and extend from, the transverse beam 32. The intermediate beams 70 are positioned approximately ¼ of the length of the transverse beam 32 from each end of the transverse beam. At the free end 72 of each intermediate beam 70 is a substantially U-shaped bracket portion 74 adapted to receive and cradle the swingable beams 46 when the latter are swung downward, as shown in FIG. 2. At the upper portion of the U-shaped brackets is an opening 76 for insertion of a rod, or bolt, 78 which retains the swingable beams 46 securely fastened to the intermediate beams 70. The length of the intermediate beams 70 is such that the swingable beams 46 rest upon the intermediate beams 70 in a position substantially parallel to the transverse beam 32. The exact length of the intermediate beams is not critical and may be longer or shorter than the length described above.

Supporting plates 80 are mounted on either side of the transverse beam 32 and are affixed to the vertical end beams 44 and the intermediate beams 70. These supporting plates 80 provide further support for the upstanding beams. Such plates may be welded or bolted to the transverse beam and the upstanding beams.

Coupled with the interface assembly 16 is a wheel assembly, such as a demountable running gear. Generally, both a forwardly 12 and rearwardly 14 mounted running gear will be required. For purposes of this discussion, only the forward running gear 12 will be described. The forward and rearward running gear are substantially identical. The forward running gear, of course, would include a steering assembly 82 and a towbar 84 for connection with a driving vehicle, such as a truck or jeep.

The demountable running gear 12, 14 of the present invention may be similar to those shown in U.S. Pat. Nos. 2,968,490, 3,378,276, and 3,521,898. The demountable running gear of such patents are incorporated herein, by reference.

Generally, the demountable running gear to be used with the present invention comprises a pair of wheels 86 on an axle, and having a pair of support arms 88 connected with the axle 90, substantially parallel to each other, and extending in the same direction, i.e., in a direction toward the container 10 or the interface assembly 16. The free ends 92 of the support arms 88 are pivotally connected with the interface assembly at 94, preferably with the transverse beam 32 of the interface assembly adjacent the upstanding intermediate beams. Extending from the support arms 88 is a piston and cylinder arrangement 96, pivotally connected to the upper portion of the intermediate beams 70, via attachment brackets 98. Also connected, substantially parallel with the piston and cylinder arrangement, is a foldable locking brace 100. The function of the locking brace 100 and piston/cylinder arrangement 96 is described in the prior art patents referenced above. Generally, when the piston and cylinder is actuated, such as by a manual pump (not shown) positioned adjacent the axle, the support arms 88 and the upstanding intermediate beams 70, pivot with respect to each other about 94, thus causing a raising and/or lowering of the interface assembly.

Figure 3:
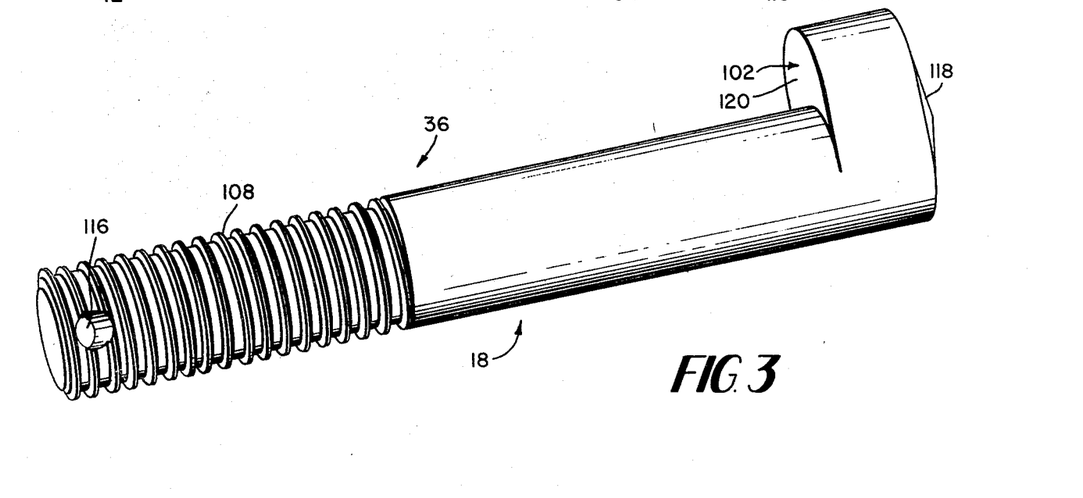
FIG. 3 is a perspective view of the locking lug.
Figure 6:
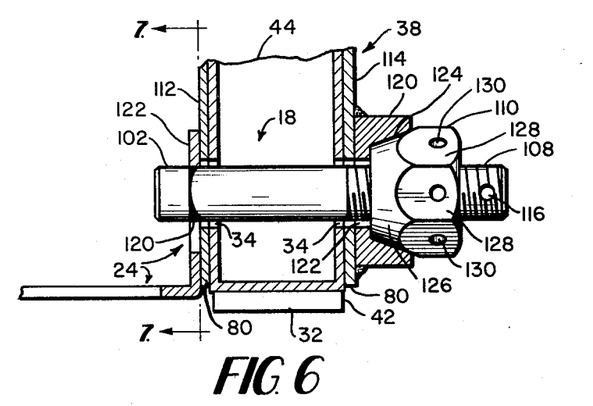
FIG. 6 is a partial cross-sectional view of the locking lug coupling the interface assembly with the ISO container opening.
Figure 7:
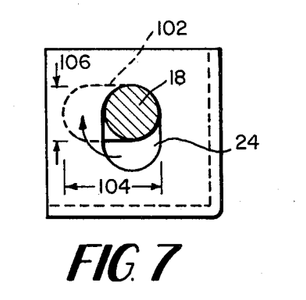
FIG. 7 is a view along section line 7—7 of FIG. 6.

The interface assembly 16 is releasably coupled to the ISO container 10 through means of a locking lug 18 as shown in FIG. 3. The locking lug 18 includes a substantially cylindrical shaft 36 having an enlarged end portion 102. As shown, the enlarged end portion 102 is substantially oblong in shape having major 104 and minor 106 axes that are correspondingly less than the major 26 and minor 28 axes of the ISO opening 24 of the container 10. The major axis 104 of the oblong end portion 102 must be greater than the minor axis 28 of the ISO opening 24. The enlarged end portion 102 is insertable through the ISO openings 24 of the container 10 when the interface assembly 16 and container 10 are in substantial alignment. At the opposite end of the lug shaft 36 is a threaded portion 108 which is adapted to receive a threaded nut 110. The cylindrical shaft 36 of the locking lug 18 is insertable through the interface assembly opening 34, in a direction from the forward face 112 of the interface assembly 16 until the shaft extends outward from the rearward face 114 to receive the nut 110. The oblong enlarged end portion 102 is inserted through the opening 24 of the ISO container 10, and the lug 18 is rotated 90°, as shown in FIGS. 6 and 7 whereby the major axis 104 of the enlarged end portion 102 is now oriented within the container 10 substantially perpendicular to the major axis 26 of the ISO opening 24 to prevent removal of the enlarged end portion 102 from the container 10. Rotation of the lug shaft 36 may be accomplished directly by hand, or by means of an opening 116 in the threaded end portion 108, substantially perpendicular to the major axis of the lug shaft, through which a rod or other element (not shown) may be placed therein to impart rotation to the lug shaft 36.

The enlarged end portion 102, at its free, forward end 118, is tapered, preferably conically, to ease the "spearing" of the lug 18 into the container's oblong opening 24. If, for example, exact alignment is not achieved, the conical tapered portion 118 will permit guidance of the enlarged end portion into the ISO corner casting opening. Similarly, the enlarged end portion includes a rearwardly facing surface 120, i.e., a surface facing in the direction toward the threaded end portion 108, which is machined substantially flat to provide a flush engagement with the inner wall 122 of the container corner casting. This provides an even distribution of forces and enables the locking lug 18, when tightened in a manner to be described, to be securely positioned within the ISO container 10.

Although the enlarged end portion 102 is shown as having an oblong cross-section substantially complementary to the opening 24 in the ISO container 10, such is not required. The enlarged end portion 102 could be of any shape so long as it is sized so as to be inserted through the opening of the container, and provided further that, when rotated 90°, it is in a blocking position to prevent removal from the container. Moreover, although the enlarged oblong end portion is shown to be eccentric to the major axis of the locking lug shaft, it should be appreciated that the enlarged portion could be designed so that it is concentric with the shaft.

The threaded end portion 108 of the locking lug 18 is of a self-locking thread design. The design is such that when a nut 110 is turned on the threaded shaft 108, the nut 110 will lock when seated tightly against a resisting surface (in this case, the interface assembly). Such nut 110 must remain in its locked position even if the structure undergoes vibration or other conditions of normal usage. On the other hand, the nut should be capable of unlocking simply by turning it backward. One such self-locking thread design that is particularly effective is the Dardelet self-locking thread, as shown and described at page 1337 of *Machinery's Handbook*, 19th Edition.

An annular collar 120 is welded to the interface assembly. The collar includes an opening 122 which aligns with the opening 34 through the interface assembly at the corners 42 thereof. This collar 120 provides a resisting surface against which the nut 110 engages. The collar includes a conical or tapered portion 124, which mates with a tapered portion 126 on the nut 110, when the nut 110 is seated therein. This complementary tapering arrangement on the nut and collar takes up the load and assists in aligning the container 10 with the interface assembly 16. For example, if the interface assembly 16 is slightly misaligned with the container 10 when the interface assembly 16 is initially wheeled into position with the container, and the locking lugs 18 are inserted in the container openings 29, the locking lugs 18 may be angled slightly with respect to the transverse beam 32 of the interface assembly. When the nut 110, having the tapered end portion 126, is seated against the complementary tapered bore 124 of the collar 120, nut rotation will not only cause the container 10 to be "pulled" in a direction toward the interface assembly 16, but also in a slight transverse direction so that the container and interface assemblies become correctly aligned. The conical tapered male 126 and female 124 interconnection between the nut 110 and the collar 120 provide for a resisting surface, against which the nut 110 rotates, in both a parallel and transverse direction.

Locking of the interface assembly 16 with the ISO container 10 is accomplished in the following manner. The locking lug shafts 36 are inserted in the interface assembly openings 34 and the nut 110 is threaded on each threaded cylindrical shaft 108. The locking lugs 18 are thus loosely confined to the interface assembly with their enlarged end portions 102 in facing relationship with the container openings 24. The interface assembly 16 is substantially aligned with the openings 24 in the ISO container 10 end wall, and the locking lug 18 enlarged end portion 102 is speared through the container openings 24 and then rotated 90° to its blocking position, thus preventing removal of the enlarged end portion. Then the nut 110, having a threaded portion engageable with the self-locking thread 108 of the shaft, is turned and tightened. Tightening of the nut 110 with respect to the shaft 108 provides a tensional force on the shaft and securely locks the interface assembly 16 to the container 10. Tightening of the nut 110 about the shaft 108 also assists in aligning the interface assembly with the container. As the nut 110 is tightened, the interface assembly 16 and the container 10 move in a direction toward each other.

The nut 110 may include facets 128 at its head, such as hexagonal facets, which facets 128 include openings 130 adapted to receive a rod (not shown) to assist in turning the nut 110. During rotation of the nut 110, it may also be necessary to insert a rod (not shown) into the opening 116 on the locking lug shaft 36, to prevent the locking lug 18 from turning backward to its unblocked position when the nut 110 is turned.

When the nut 110 is fully tightened, and the container 10 and interface assembly 16 are in engagement, the nut 110 will be self-locking with respect to the locking lug threaded shaft 108; the nut will not rotate backward by vibration or other normal usage. When the interface assembly 16 is to be removed from the container, the nut 110 is simply rotated backwards (counterclockwise) to unlock.

The locking lug 18, as described above, may have utility other than in attaching a wheel and interface assembly to an ISO container. Generally, the locking lug 18 may be useful in attaching any structure to an ISO container, so long as the structure has some sort of opening through which the locking lug shaft can pass.

The vertical beam assemblies 38 of the interface assembly 16 are coupled with the top wall, or ceiling, 132 of the container 10 when the swingable beams 46 are arranged substantially vertical, i.e., an alignment with, the vertical end beams 44. Positioned within the top wall 132 of the container 10, through the oblong top openings 24, is a standard ISO connection assembly, such as the "swing loc" bridge manufactured by Line Fast Corp., as described above, and illustrated in FIG. 8. Essentially, such ISO connection assembly comprises a pair of brackets 258 extending from the top plane 134 of the ISO corner casting 20 and having a horizontal rod 260 extending therebetween. Rotatably mounted on the rod is an annular cylindrical member 262, which is swingable about the rod 260. Extending from the cylindrical member is a shaft 264, which is threaded 266, and which has a sleeve nut 268 and a locking nut 270 thereon. The shaft 264 is rotated so that the sleeve nut 268 rests within the U-shaped yoke portion 58 at the top of the swingable beam 46 and the locking nut 270 is turned to lock the sleeve nut in position. A gravity lock pin 272 is inserted through openings in the U-shaped yoke portion, to retain the sleeve nut 268 within the U-shaped yoke 58.

It should be appreciated to those of ordinary skill in the art that each swingable beam 46 may include an opening, substantially similar to the opening in the transverse beam. In such case, a locking lug, similar to that described above, may be inserted therein, and then engage with the oblong opening in the end wall of the ISO container.

Figure 9:
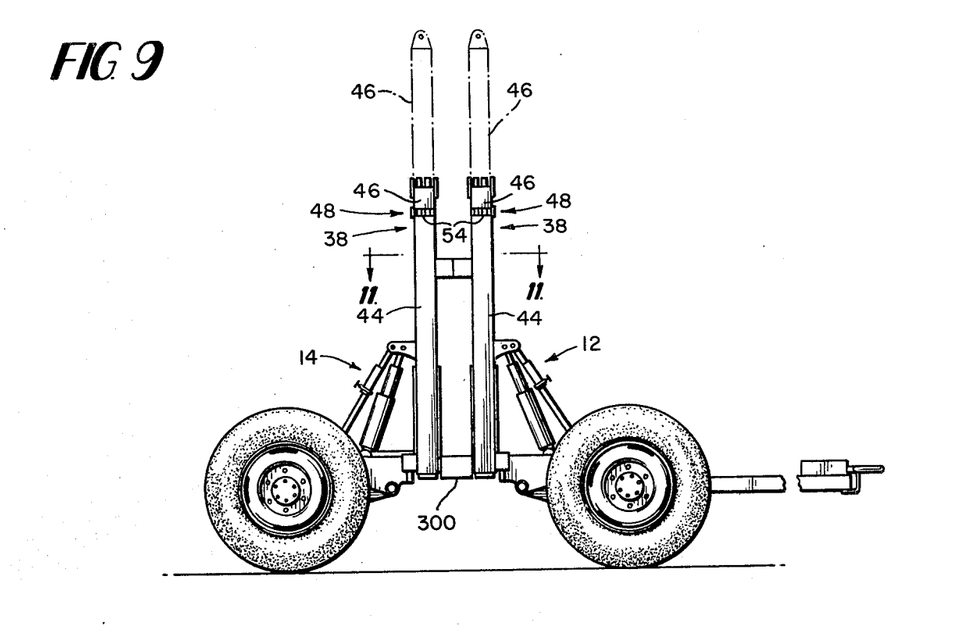
FIG. 9 is a side view of the front and rear wheel assemblies coupled to each other.
Figure 10:
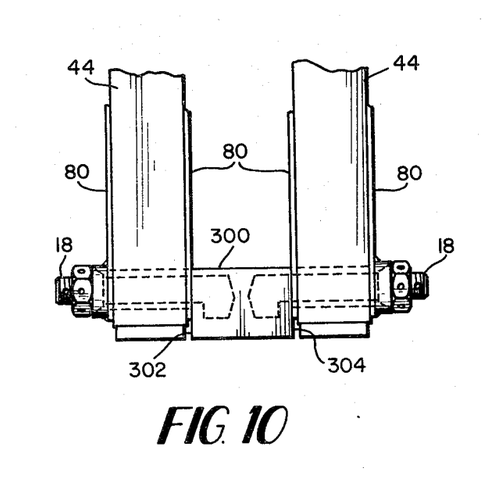
FIG. 10 is a partial end view of the front and rear interface assemblies coupled to each other via the hollow block.
Figure 11:
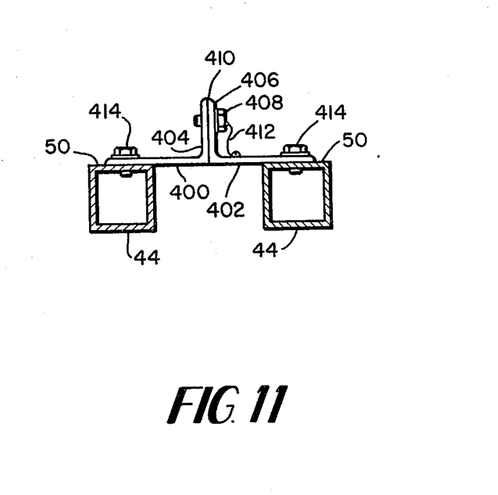
FIG. 11 is a view along line 11—11 of FIG. 9.

FIGS. 9–11 depict the wheel assemblies 12, 14 coupled, or "married" to each other, independent of the ISO container 10. This is frequently desirable so that the forward 12 and rearward 14 wheel assemblies can be towed to a location where they can be used in conjunction with the container 10. When in their coupled arrangement, the swingable beams 46 are swung into their folded position and rest atop the intermediate vertical beams 70 where they are locked thereto by means of a pin, or bolt, 78 that extends through the faces of the U-shaped brackets 74 of the intermediate vertical beams 70. (See FIG. 2.) The interface assemblies 16 are coupled to each other at the bottom portions thereof, by providing blocks 300, such as hollow aluminum blocks, having oblong openings (not shown) in opposite faces 302, 304, the openings having substantially the same dimensions as the standard ISO corner openings 24. The locking lugs 18 of the opposed interface assemblies are inserted into the openings in the aluminum blocks 300, and then rotated and secured in a manner as described above. It should be noted that the aluminum block 300 may also be a unitary transverse member, having a length substantially corresponding to the length of the transverse beam, and having oblong ISO openings at either end so as to be substatially alignable with the openings in the transverse beam, although generally such is combersome and impractical. Preferably two separate smaller blocks, independent of each other, are provided for separately attaching each bottom end corner of the interface assemblies.

Rotatably mounted on each vertical end beam are L-shaped angle members 400, 402. The L-shaped angle members are bolted to a side face 50 of the vertical end beams 44 and have a right-angled portion 404, 406 having an opening for receiving a bolt. The right-angled portions 404, 406 on opposed vertical end beams, i.e., vertical beams on the front and rear assembly, are adapted to be mated and in flush contact with each other, at 410, whereby a bolt 408 can be inserted therein for locking the L-shaped members together. The bolt 408 may be secured to the L-shaped member 402 by a wire attachment 412, as shown. When the wheel assemblies are to be coupled to a container, bolts 414 interconnecting the L-shaped members to the side face 50 of the vertical end beams 44 are loosened, the L-shaped members 400, 402 rotated downwardly (or upwardly) so as to not interfere with the container when the interface assemblies are coupled thereto.

The foregoing is considered as illustrative only of the principles of the invention. Further, since numerous modifications and changes will readily occur to those skilled in the art, it is not desired to limit the invention to the exact construction and operation shown and described and, accordingly, all suitable modifications and equivalents may be resorted to.

What is claimed is:

1. Apparatus for releasably attaching a wheel assembly to a body unit having standardized corner openings thereon, the apparatus comprising:
a frame adapted to be connected with the wheel assembly for coupling the wheel assembly to the body unit, said frame including at least two frame openings substantially alignable with the standardized corner openings;
securing means for releasably securing said frame with said standardized corner openings, said securing means comprising a substantially circular shaft insertable into each of the frame openings and having a cross-sectional area less than the area of said frame openings so that the shaft is loosely confined so as to be angularly displaceable with respect to a center line of said frame openings, said shaft having an enlarged end portion, the enlarged end portion insertable through the standardized corner openings, said shaft movable with respect to said frame in a direction substantially along the axis of the shaft so that the enlarged end portion of the shaft is insertable within the standardized corner openings when the frame is spaced from the body unit, rotating means for rotating said shaft to orient the enlarged end portion in a blocking position to prevent removal of the enlarged end portion from the standardized corner openings, tensioning means for tensioning the shaft with respect to the body unit, and locking means for preventing rotation of said shaft from its blocking position.

2. The apparatus of claim 1 wherein said tensioning means comprises a screw-threaded end portion on said shaft, opposite the enlarged end portion, said screw-threaded end portion extending from said frame, and a nut threaded on said screw-threaded end portion, whereby rotation of said nut results in tensioning the shaft with respect to the body unit.

3. The apparatus of claim 2 wherein said locking means comprises said screw-threaded end portion having a self-locking thread to prevent rotation of said shaft from its blocking position.

4. The apparatus of claim 3 wherein said self-locking thread is a Dardelet-type screw thread.

5. The apparatus of claim 1 wherein said standardized corner openings are non-circular having a major axis and a minor axis, and wherein said enlarged end portion of said shaft is non-circular having a major axis and a minor axis, the major and minor axes of said enlarged end portion having lengths less than the corresponding major and minor axes of said standardized corner opening, to allow passage of said enlarged end portion through the opening, and wherein the length of the major axis of said enlarged end portion is greater than the length of the minor axis of said opening, to prevent removal of said enlarged end portion from the opening when the shaft is rotated to its blocking position.

6. The apparatus of claim 5 wherein said standardized corner opening is oblong, said enlarged end portion is oblong in cross-section, and the remaining portion of said shaft is circular in cross-section.

7. The apparatus of claim 6 wherein the oblong end portion is eccentric with respect to the remaining portion of said shaft.

8. The apparatus of claim 2 further comprising an annular collar affixed to said frame and surrounding each of the frame openings, said collar including a conical seating means for mating with said nut, and wherein said nut includes a conical portion complementary with said conical seating means for mating engagement therewith.

9. The apparatus of claim 2 wherein said rotating means comprises an opening in the threaded end portion of said shaft extending substantially perpendicular to the major axis of said shaft, said opening adapted to receive a rod for turning the shaft and nut with respect to each other.

10. The apparatus of claim 3 wherein said nut is unlockable from the threaded cylindrical shaft by turning the nut and shaft in an unlocking direction with respect to each other.

11. The apparatus of claim 10 wherein said self-locking cylindrical shaft and nut comprise a Dardelet-type screw threaded connection.

12. The apparatus of claim 1 wherein the enlarged end portion has a flat face on a surface engageable with the body unit to provide a firm abutment with the body unit.

13. The apparatus of claim 12 wherein the enlarged end portion forms a substantially conical tapered portion at its extreme end for entry into said standardized corner opening of said body unit.

14. Apparatus for releasably attaching a wheel assembly to a wall of a container, said container having standardized corner fittings in each corner, each standardized corner fitting having openings, the apparatus comprising, a frame having a transverse beam with openings adjacent opposite ends of said beam substantially alignable with the openings in the standardized corner fittings of the container wall, said transverse beam including means for connection with a wheel assembly, said frame further comprising a pair of vertical beam assemblies each vertical beam assembly connected with and extending upwardly from the transverse beam adjacent to the transverse beam opening, the upper ends of each vertical beam assembly including means for releasable connection with a standardized corner fitting wherein each vertical beam assembly comprises a pair of vertical end beams fixedly connected to said transverse beam, and a pair of swingable beams hingedly connected to said vertical end beams, said swingable beams movable from a first position, in alignment with said vertical end beams, to a second position substantially parallel with said transverse beam, securing means for releasably securing said transverse beam to said container when said transverse beam openings are substantially aligned with said standardized corner fittings, said securing means comprising a cylindrical shaft threaded at one end and having an enlarged end portion at its opposite end, the enlarged end portion insertable through the openings in said standardized corner fitting, said threaded end of said shaft extending rearwardly from the transverse beam, a nut threaded to said threaded end, and rotating means for rotating said cylindrical shaft to orient the enlarged end portion into a blocking position to prevent removal of the enlarged end portion from the standardized corner fitting.

15. The apparatus of claim 14 wherein said frame further comprises a pair of intermediate vertical beams fixedly connected with said transverse beam, between said vertical beam assemblies, and having a length substantially equal to the length of said vertical end beams, each of said intermediate vertical beams having means for locking said swingable beam in a position substantially parallel with said transverse beam.

16. The apparatus of claim 15 further comprising a wheel assembly, said wheel assembly comprising a pair of ground-supported wheels rotatably mounted on an axle, a pair of support arms extending from said axle and pivotally coupled with said transverse beam, and hydraulic piston and cylinder means coupled between said support arms and said intermediate vertical beams for pivotal movement of said support arms and said intermediate vertical beams to cause a raising and lowering of said frame.

17. Apparatus for releasably attaching a wheel assembly to a body unit having standardized corner openings thereon, the apparatus comprising:

a frame adapted to be connected with the wheel assembly for coupling the wheel assembly to the body unit, said frame including a transverse beam having at least two openings substantially alignable with the standardized corner openings, a pair of vertical end beams extending upward from opposite ends of said transverse beam, a second pair of vertical beams extending upward from said transverse beam between the pair of vertical end beams, each of said pair of vertical end beams having swingable beams hinged thereto for swinging from a first position, in alignment with said pair of vertical end beams, to a second position substantially parallel to said transverse beam, wherein said swingable beams are lockable to the second pair of vertical beams;

securing means for releasably securing said frame with said standardized corner openings, said securing means comprising a shaft having an enlarged end portion, the enlarged end portion insertable through the standardized corner openings, rotating means for rotating said shaft to orient the enlarged end portion in a blocking position to prevent removal of the enlarged end portion from the standardized corner openings, tensioning means for tensioning the shaft with respect to the body unit, and locking means for preventing rotation of said shaft from its blocking position.

18. The apparatus of claim 17 wherein said swingable beams include means for engaging and locking with standardized corner openings on said body unit.

* * * * *